United States Patent [19]

Howard, Sr.

[11] Patent Number: 4,834,437
[45] Date of Patent: May 30, 1989

[54] CLASPING DEVICE

[76] Inventor: Alfred R. Howard, Sr., 110 E. Summit Rd., Wilmington, Del. 19804

[21] Appl. No.: 144,055

[22] Filed: Jan. 15, 1988

[51] Int. Cl.[4] .......................... B25J 1/00; B63B 21/00
[52] U.S. Cl. ............................... 294/19.1; 114/221 R; 114/230; 294/110.1
[58] Field of Search ............................. 294/19.1–19.3, 294/22, 23, 66.1, 80, 85, 110.1, 115; 114/221 R, 230; 119/151, 154

[56] References Cited

U.S. PATENT DOCUMENTS

| | | | |
|---|---|---|---|
| 640,199 | 1/1900 | Holland | 119/151 |
| 653,973 | 7/1900 | Svenson | 119/151 |
| 1,112,867 | 10/1914 | Taylor et al. | 119/151 |
| 1,453,301 | 5/1923 | Winkler | 294/22 |
| 1,482,366 | 1/1924 | Neller | 119/154 |
| 1,966,177 | 7/1934 | Kramer | 294/19.3 |
| 2,428,734 | 10/1947 | Blackford | 119/154 |
| 2,591,638 | 4/1952 | Trafton | 294/19.1 |
| 3,219,376 | 11/1965 | Peters | 294/19.1 |
| 3,945,335 | 3/1976 | Kratz | 294/19.1 X |
| 4,000,576 | 1/1977 | Jones | 294/19.1 X |

FOREIGN PATENT DOCUMENTS

| | | | |
|---|---|---|---|
| 2409004 | 7/1979 | France | 119/154 |
| 49750 | 11/1931 | Norway | 119/154 |

Primary Examiner—Johnny D. Cherry
Attorney, Agent, or Firm—Lipton, Famiglio & Elman

[57] ABSTRACT

A manually operated device to aid in docking a boat by clasping a dock bollard or in clasping other stationary pole-like objects. This invention comprises two outwardly rotating semicircular jaws, linked by a linkage mechanism, that clasp together and latch together to encircle an object such as a dock bollard or stationary pole. Release of the bollard or pole is accomplished by twisting the clasping device so that the sides of the jaws detach themselves from the latching position.

5 Claims, 2 Drawing Sheets

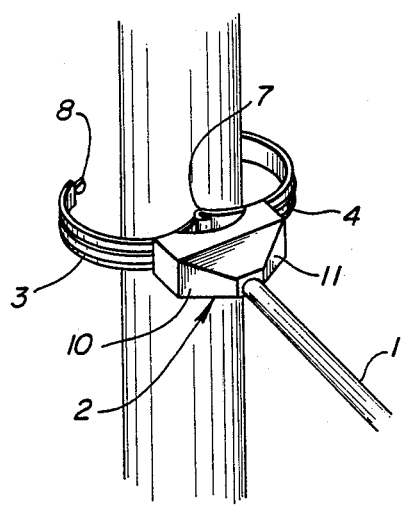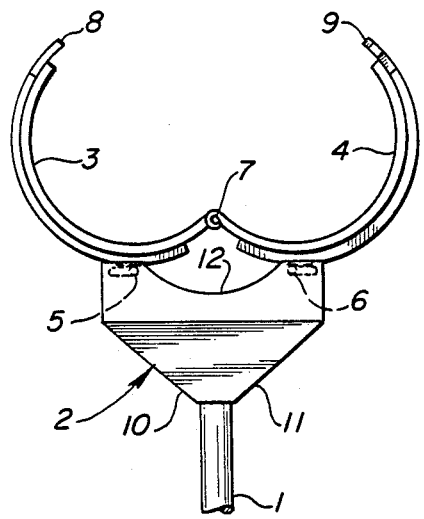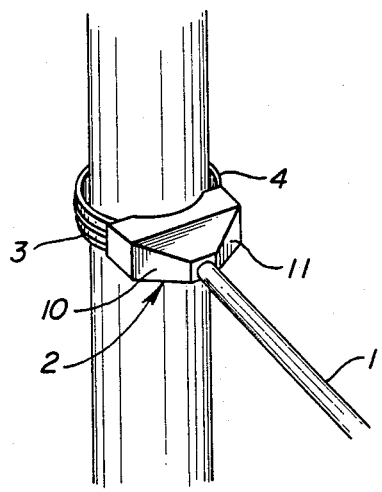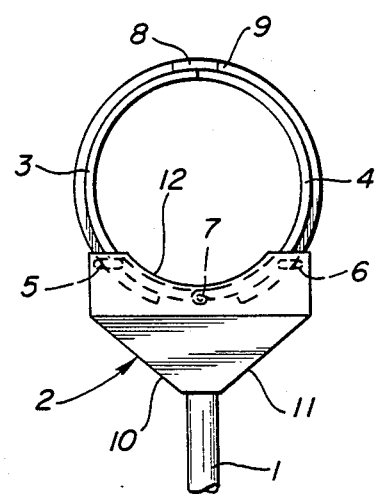

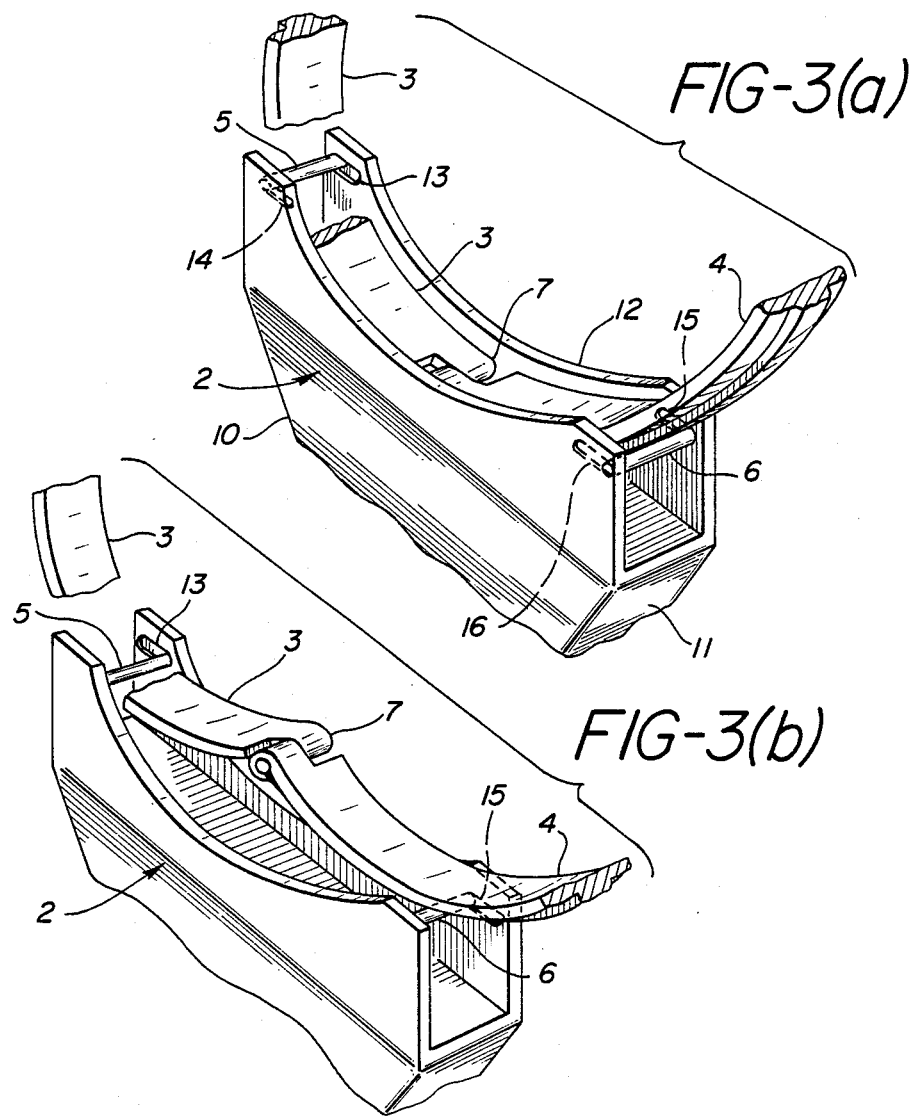
FIG-3(a)
FIG-3(b)
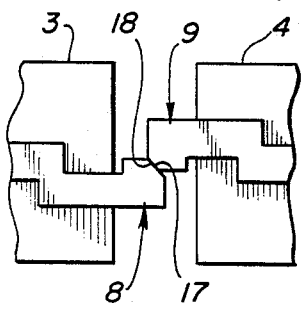
FIG-4(a)
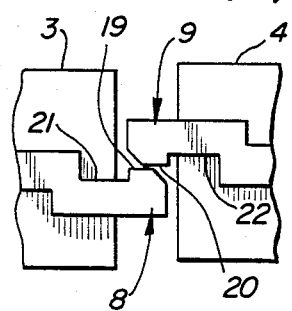
FIG-4(b)
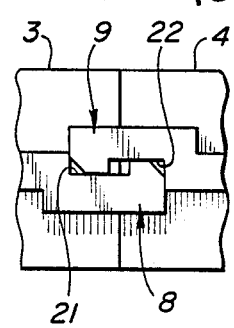
FIG-4(c)

//4,834,437

CLASPING DEVICE

BACKGROUND OF THE INVENTION

1. Field of the Invention

The present invention pertains primarily to means to aid in docking a boat cheaply and easily. The invention can also be used to clasp other stationary pole-like items.

For many years, boaters have looked for better ways to dock a boat. Conventional ways of docking or mooring a boat are fraught with problems. Marinas are often crowded, increasing the chances of damaging one's own boat or adjacent boats. Weather or currents may cause the boat to rock unpredictably. Persons on the dock may be able to help in pulling the boat in by rope, but may not be available.

Other inventors have used extendable docking poles topped with rings or other means to grasp dock bollards and other stationary objects. These devices introduced a new set of problems. Some of these devices are mechanically complex, increasing both the cost of the device and its chances for breakdown. Other devices are cumbersome to use because they require one to reach around or over stationary objects, which may be too tall or otherwise inaccessible to such movements.

The present invention is in the same field as such inventions, but significantly improves over them. In addition to a docking pole, the present invention is comprised of a bracket mounted on the end of the pole and two oppositely rotating jaws pinned to the bracket. The jaws are hinged together at their back end, such that they have synchronous, opposite rotations. In the open position, each jaw is rotated outwardly from the bracket, leaving an open mouth between the jaws. In the closed position, the two jaws close to form a full circle and are latched together by latching means at the forward end of each jaw. This configuration allows one to pull a boat into a dock with no need to use rope, no need to adjust moveable parts and no need to reach around or over stationary objects. The invention can also be used to reach and clasp hard-to-reach tree branches and other stationary, pole-like objects.

2. Description of the Prior Art

Applicant's search has disclosed the following U.S. patents:

| U.S. Pat. Nos. | Date of Issue | Name of the Inventor |
| --- | --- | --- |
| 3,013,517 | 12/19/61 | Isham |
| 4,441,746 | 4/10/84 | Corboy, Jr. |
| 3,841,685 | 10/15/74 | Kolodziej |
| 3,861,346 | 1/21/75 | Pina |
| 3,993,013 | 11/23/76 | Nunziato |
| 2,983,243 | 5/9/61 | Bowers |
| 3,347,586 | 10/17/67 | Sharp |
| 2,913,797 | 11/24/59 | Hollis |

The prior art contains many devices having semi-circular jaws that close around or otherwise aid in enclosing an object. In Isham's U.S. Pat. No. 3,013,517, two semi-circular jaws are pinned to a bracket base. A third member sits at the back of the mouth between the two semi-circular jaws. Each jaw has a pin jutting from it that rides in a slot in the third member, said slot placed on a line tangential to the curve of the jaw. When an object enters the mouth of the device and pushes up against the third member, the jaws ride up the slots and close around the object. Thus, this invention is closed when an object hits the back of its mouth, as is the applicant's. However, the Isham device entails much greater mechanical complexity, increasing its cost and decreasing its reliablity.

Corboy's U.S. Pat. 4,441,746, for a hand-held pick-up tool also uses semi-circular jaws that close to form a circle. The jaws are each attached to opposing movable elbows, which are in turn attached to a recoiled spring in the open position. The device is closed by pulling a rod attached to the back of the recoiled spring, thus extending the opposing elbows and pulling the jaws together. The device therefore closes by a pulling rather than pushing mechanism, and it does not lock in the closed position.

Hollis' U.S. Pat. No. 2,913,797, shows two curved arms pivotally connected intermediate their length, each with a pointed finger at its end and a small pulley near its end. The two arms open like pliers to accommodate different sized objects to be grasped. The grasped object is held by the pointed fingers and a rope threaded over both pulleys. Thus, unlike the applicant's invention, Hollis' invention uses a pliers-like mechanism to open around an object and uses rope tension to hold the object in place. Furthermore, the invention does not fully enclose the object grasped nor lock in place.

Sharp's U.S. Pat. No. 3,347,586, for a siphon holding structure, shows a mechanism similar to that of Corboy's invention. Sharp's invention includes two semi-circular arms that fit on one side of a cylindrical object and a third semicircular arm that fits on the other side of the object. Like Corboy's invention, Sharp's invention is kept open by a recoiled spring and closed by pulling a rod attached to that spring. This invention is, therefore, more like Corboy's invention than applicant's invention.

The other patents listed disclose docking devices that are only superficially similar to the applicant's device. Bowers' U.S. Pat. No. 2,983,243, shows a docking device using a hook-shaped rod and a T-shaped rod to form a recess in which a stationary object is enclosed. This device is secured by first grasping the object with the hook and then pushing the T-rod up against the object hooked. The T-rod is kept in place by a ratcheting mechanism. Kolodziej's invention, U.S. Pat. No. 3,841,685, uses two rigid, hollow, opposing arcs through which a line of rope is threaded. Kolodziej's invention, therefore, merely helps a line of rope to enclose an object. Nunziato's device U.S. Pat. No. 3,993,013, is merely a ring mounted on an extendable rod. Pina's device, U.S. Pat. No. 3,861,346, is merely an adjustable ring attached to a rod and rope. Neither the Bowers, Pina, Nunziato, nor Kolodziej device uses hinged movable jaws as does the applicant's device, and each requires a user to reach over or around a stationary object. These inventions can help to dock a boat, but that is where their similarity to the applicant's invention ends.

None of the devices located by our search have suggested the use of two oppositely rotating semi-circular jaws, hinged together at their back ends with latching mechanism at their fore ends, such that the device encloses a stationary object and latches in place by simply pushing the adjoining pin up against the object. Applicant's device closes simply by pushing the docking pole against a dock bollard or other stationary polelike structure. The semi-circular jaws encircle an object and latch in place by means of interlocking latching hooks. The Applicant's unique combination of a reaching pole, hinged encircling jaws and latching hooks is a significant improvement over the prior art.

SUMMARY OF THE INVENTION

The invention is attached to the end of a "docking pole". A bracket at the end of the docking pole is attached so that it is restrained in all directions. Two semi-circular jaws are attached to the bracket such that each is free to rotate about the point of attachment. These semi-circular jaws pivotally connected at one end, however, so that the two jaws can only rotate synchronously and oppositely. By this configuration, the jaws may only rotate away from one another to form an open mouth and toward one another to form a closed circle. At their opposite ends, the jaws have latching mechanisms that hold the jaws together in the closed position.

In the open position, the hinge joining the two jaws is thrust away from the bracket. In the closed position, the two jaws form a complete circle held together by the latching mechanism. The jaws are closed by pushing the hinge up against stationary object, causing the jaws to rotate towards one another and latch together to form a full circle.

BRIEF DESCRIPTION OF THE DRAWING

FIGS. 1 (a) and (b) are perspective views showing how the devise clasps stationary pole-like objects.

FIG. 2 (a) is a side view of the clasping device shown in the open position.

FIG. 2 (b) is a side view of the clasping device shown in the closed position.

FIGS. 3 (a) and (b) are perspective views of the clasping device in the open and closed positions.

FIGS. 4 (a), (b), and (c), respectively, show the latching hooks prior to, during, and after latching.

DESCRIPTION OF THE PREFERRED EMBODIMENT

FIG. 1 (a) and (b) demonstrate how the device functions. In FIG. 1 (a), the device has not yet come in contact with the stationary object. In FIG. 1(b), the device has contacted and closed around the stationary object.

FIG. 2(a) and (b) show the placement of the docking pole 1, bracket 2, semi-circular jaws 3 and 4, pins 5 and 6, hinge 7, and latching mechanisms 8 and 9.

The bracket 2 is mounted on the end of the docking pole 1 such that it is constrained in all directions. The bracket itself is largely in the shape of an isosceles triangle, with sides 10 and 11 of equal length. The bracket 2 is mounted so that the center line of the docking pole point bisects the angle between sides 10 and 11. The remaining side of the triangle is replaced by arc 12, which is part of a circle that would be bisected by the center line of the pole 1.

The jaws 3 and 4 are attached to the bracket 2 at points intermediate their length by pins 5 and 6. Each jaw is free to rotate about the pin connecting it to the bracket. The two jaws are pinned together at hinge 7, which lies along the center line of the docking pole 1. The two jaws are curved such that they form a complete circle in the closed position.

In the open position, shown in FIG. 2(a), each jaw has rotated about its respective pin away from the opposing jaw. The opposing rotation of the jaws pushes hinge 7 away from arc 12 of the bracket. In the closed position, the jaws 3 and 4 enclose the circle defined by arc 12. The device reaches the closed position by pushing hinge 7 up against a stationary object such as a dock bollard, causing jaws 3 and 4 to rotate toward one another and eventually latch into a full circle around the object.

FIG. 3(a) is a perspective view that shows pin 5 in slot 13 and pin 6 in slot 15, with the jaws in the closed position. FIG. 3(b) is a perspective view showing pins 5 and 6 in slots 14 and 16, respectively, with the jaws in the open position. Each slot is placed parallel to a tangent from the circle defined by arc 12. In the closed position, pins 5 and 6 are at the outer edges of the slots. As the jaws open, the pins 5 and 6 ride along their slots toward the center of the bracket and allow the jaws to open further.

FIGS. 4 (a), (b), and (c) show the latching mechanisms 8 and 9 of the device. FIG. 4 (a) shows the latching mechanisms prior to latching. When the jaws 3 and 4 close, angled surfaces 17 and 18 slide along one another as shown in FIG. 4 (a). As the jaws continue to close, surfaces 19 and 20 slide along one another as shown in FIG. 4 (b). Eventually, the surfaces 19 and 20 slip into the recesses 21 and 22, respectively, and the jaws are thus latched together. In an alternative embodiment (not shown), surfaces 17 to 20 are replaced by curved surfaces, so that each latching mechanism is more hook-like.

There are various changes and modifications that may be made to applicant's invention, as would be apparent to those skilled in the art. However, any of these changes or modifications are included in the teaching of applicant's disclosure, and he intends that his invention be limited only by the scope of the claims appended hereto.

What is claimed is:

1. A device for clasping a stationary object, such as a bollard, comprising:
   (a) a pole;
   (b) a stationary bracket rigidly attached to one end of the pole;
   (c) a pair of jaws pivotally connected at back ends of the jaws; and
   (d) slidable pivotal connection means for connecting the jaws to the stationary bracket, so that each of the jaws may rotate about the stationary bracket and may also move translationally in relation to the stationary bracket, allowing the jaws to attain a closed position wherein front ends of the jaws touch while the back ends are adjacent the stationary bracket, and also allowing the jaws to slide and rotate synchronously and oppositely to an open position wherein the front ends are spaced apart while the back ends jut away from the stationary bracket.

2. The device of claim 1, wherein the stationary bracket comprises a first plate and a second plate with the plates spaced apart to define a recess therebetween, so that the jaws may fit inside the recess.

3. The device of claim 2, wherein the slidable pivotal connection means comprise:
   (a) a pair of hinge housings, wherein each one of the jaws has one of the hinge housings attached thereto;
   (b) the first plate, having a pair of first plate slots defined by sides of the first plate, with the first plate slots opening into the recess between the first and second plates;

(c) the second plate, having a pair of second plate slots defined by sides of the second plate, with the second plate slots opening into the recess between the first and second plates and in registration with the pair of first plate slots; and (d) a pair of pins, wherein each one of the pins is disposed in one of the hinge housings, one of the first plate slots, and one of the second plate slots, so that the hinge housings are rotatable about the pins while the pins are slidable in the slots.

4. The device of claim 1, further comprising latching means for holding the jaws in the closed position, wherein the latching means are integral with the jaws and are located at the front ends of the jaws.

5. The device of claim 4, wherein the latching means comprise a pair of cooperative opposing hooks, wherein each of the hooks defines a hook recess enabling the hook to secure the opposing hook.

* * * * *